(12) United States Patent
Sandinge et al.

(10) Patent No.: US 11,820,312 B2
(45) Date of Patent: Nov. 21, 2023

(54) VEHICLE SEAT ASSEMBLY WITH A VEHICLE SEAT AND A SIDE AIRBAG ASSEMBLY AND SIDE AIRBAG UNIT

(71) Applicant: Autoliv Development AB, Vargarda (SE)

(72) Inventors: Par Sandinge, Alingsås (SE); Jonas Bjorkqvist, Billdal (SE); Charlotte Lundqvist, Vargarda (SE); Thomas Dillinger, Burscheid (SE)

(73) Assignee: Autoliv Development AB, Vargarda (SE)

( * ) Notice: Subject to any disclaimer, the term of this patent is extended or adjusted under 35 U.S.C. 154(b) by 23 days.

(21) Appl. No.: 17/632,728

(22) PCT Filed: Jul. 27, 2020

(86) PCT No.: PCT/EP2020/071099
§ 371 (c)(1),
(2) Date: Feb. 3, 2022

(87) PCT Pub. No.: WO2021/023542
PCT Pub. Date: Feb. 11, 2021

(65) Prior Publication Data
US 2022/0274556 A1    Sep. 1, 2022

(30) Foreign Application Priority Data

Aug. 8, 2019 (DE) .................... 10 2019 121 475.0

(51) Int. Cl.
*B60R 21/207* (2006.01)
*B60R 21/217* (2011.01)
(Continued)

(52) U.S. Cl.
CPC .......... *B60R 21/207* (2013.01); *B60R 21/217* (2013.01); *B60R 21/237* (2013.01);
(Continued)

(58) Field of Classification Search
None
See application file for complete search history.

(56) References Cited

U.S. PATENT DOCUMENTS 7,789,419 B2 *   9/2010  Smith ................... B60R 21/207
                                                                                        280/730.2
7,883,105 B2 *   2/2011  Smith ................... B60R 21/207
                                                                                        280/730.2
(Continued)

FOREIGN PATENT DOCUMENTS

DE      10 2011 016676 A1    10/2012
DE      10 2017 113 105 A1    12/2018
(Continued)

*Primary Examiner* — Faye M Fleming
(74) *Attorney, Agent, or Firm* — Harness, Dickey & Pierce, P.L.C.; Stephen T. Olson

(57) ABSTRACT

A vehicle seat assembly with a vehicles seat and a side airbag assembly is described. The vehicle seat has a seat-ing and a backrest comprising a frame. The side airbag assembly is attached to a side portion of the frame and comprises a side airbag being at least partially rolled to an airbag package in the not deployed state and extending from a rear end to front end in the deployed state. The airbag assembly further comprises at least one wrapper extending at least partially around at least a section of the airbag package. The airbag package has a length and a maximum thickness. The at least one wrapper ex-tends from a first end being attached to the side airbag at the rear end of the side airbag to a second end.

12 Claims, 5 Drawing Sheets

Figure 8:
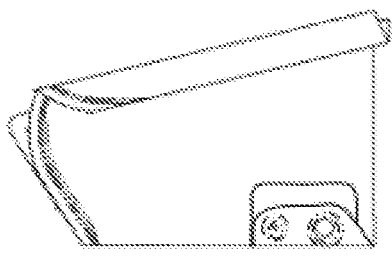

(51) Int. Cl.
*B60R 21/231* (2011.01)
*B60R 21/237* (2006.01)

(52) U.S. Cl.
CPC .................. *B60R 21/23138* (2013.01); *B60R 2021/23146* (2013.01)

(56) References Cited

U.S. PATENT DOCUMENTS

| | | | |
|---|---|---|---|
| 8,439,394 B2 * | 5/2013 | Tracht | B60R 21/201 |
| | | | 280/730.2 |
| 9,108,589 B2 * | 8/2015 | Rickenbach | B60R 21/23138 |
| 11,518,338 B1 * | 12/2022 | Montgomery | B60R 21/23138 |
| 2012/0175862 A1 | 7/2012 | Tracht | |
| 2015/0123382 A1 | 5/2015 | Rickenbach | |
| 2021/0138991 A1 * | 5/2021 | Baldreus | B60R 21/23138 |
| 2022/0402455 A1 * | 12/2022 | Kobayashi | B60N 2/68 |

FOREIGN PATENT DOCUMENTS

| | | | | |
|---|---|---|---|---|
| DE | 102017113105 A1 * | 12/2018 | | B60R 21/207 |
| JP | H11 91476 A | 4/1999 | | |
| WO | 2013/034742 A1 | 3/2013 | | |

\* cited by examiner

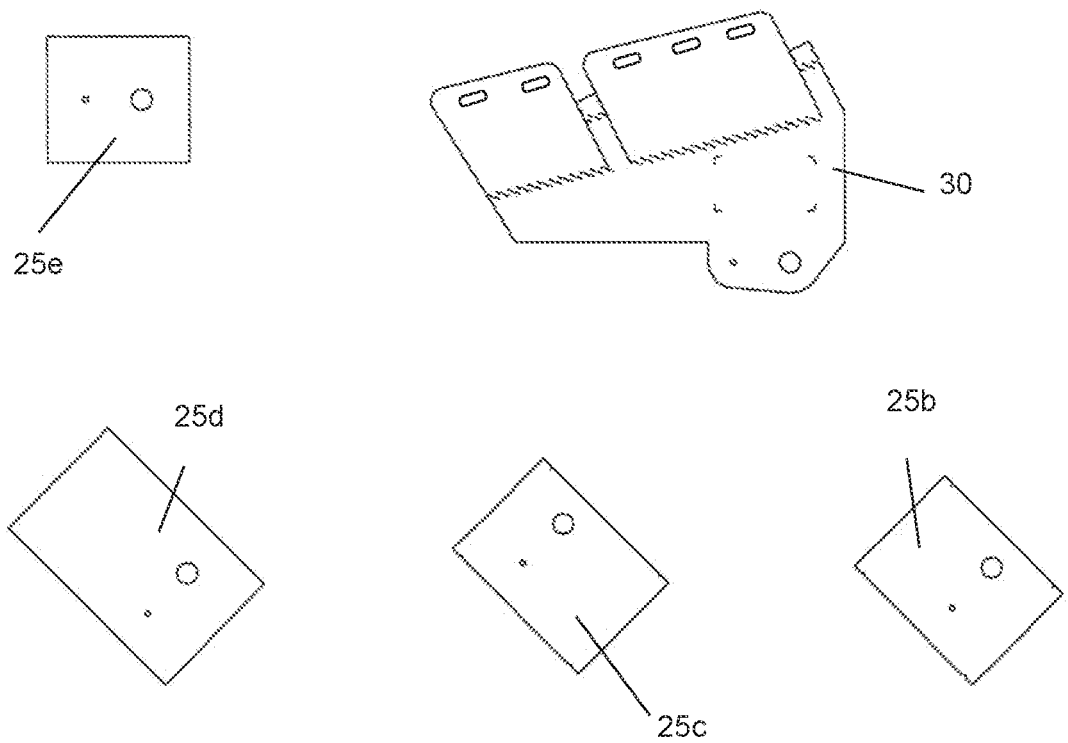
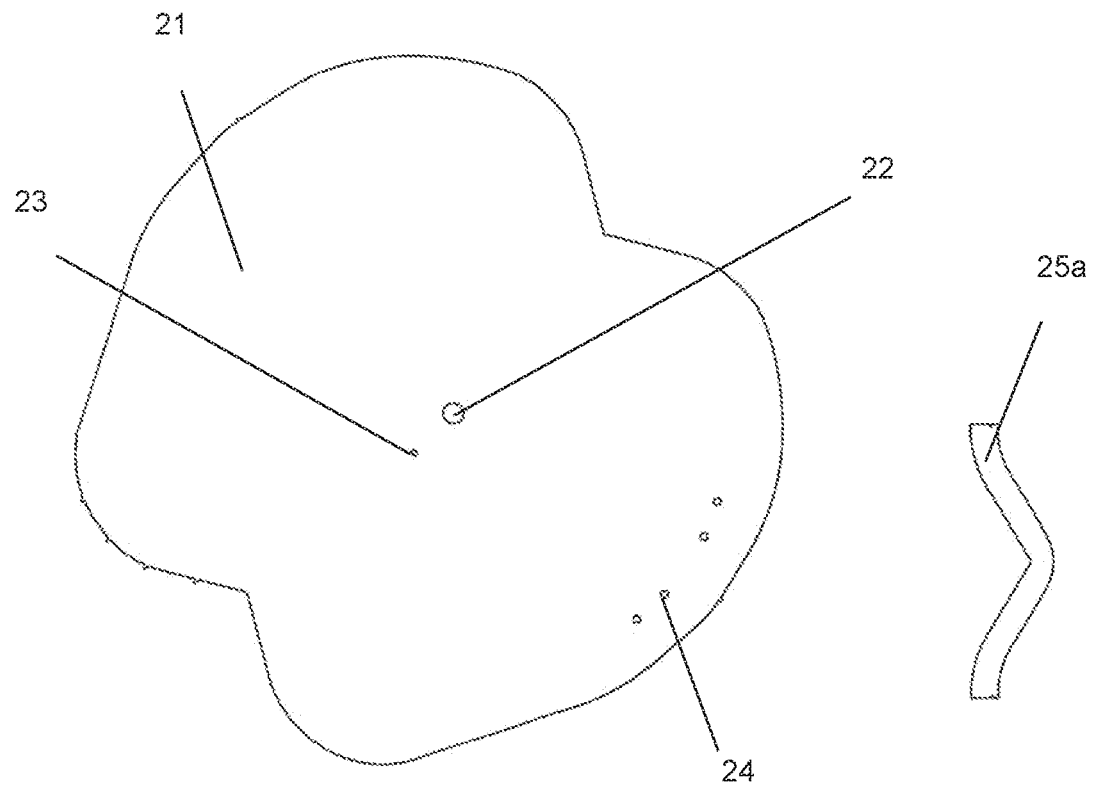
Fig. 1

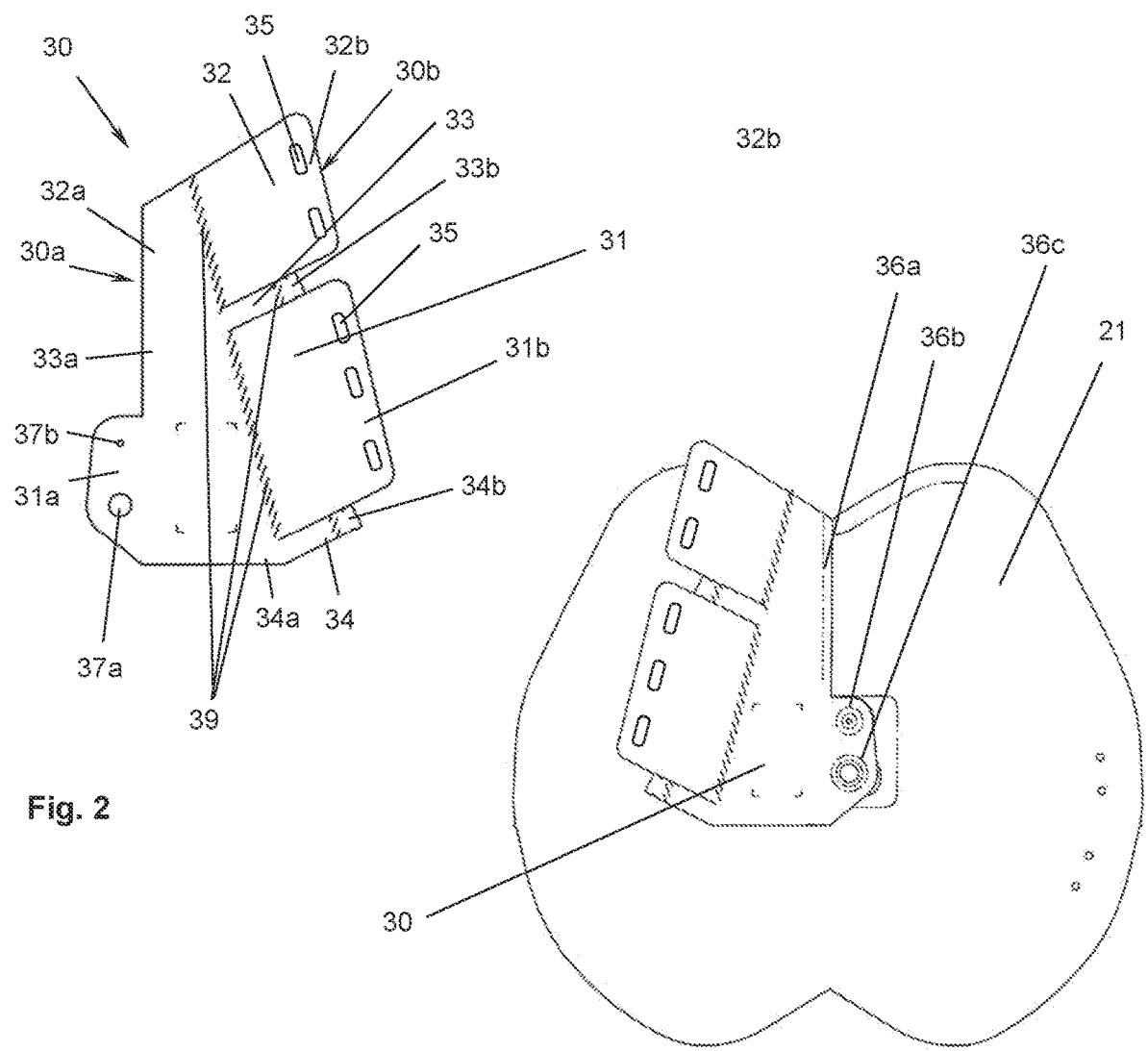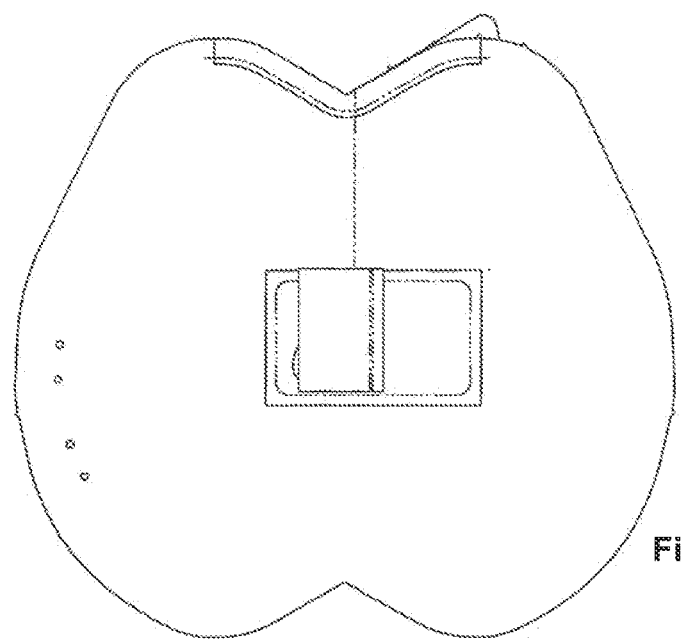

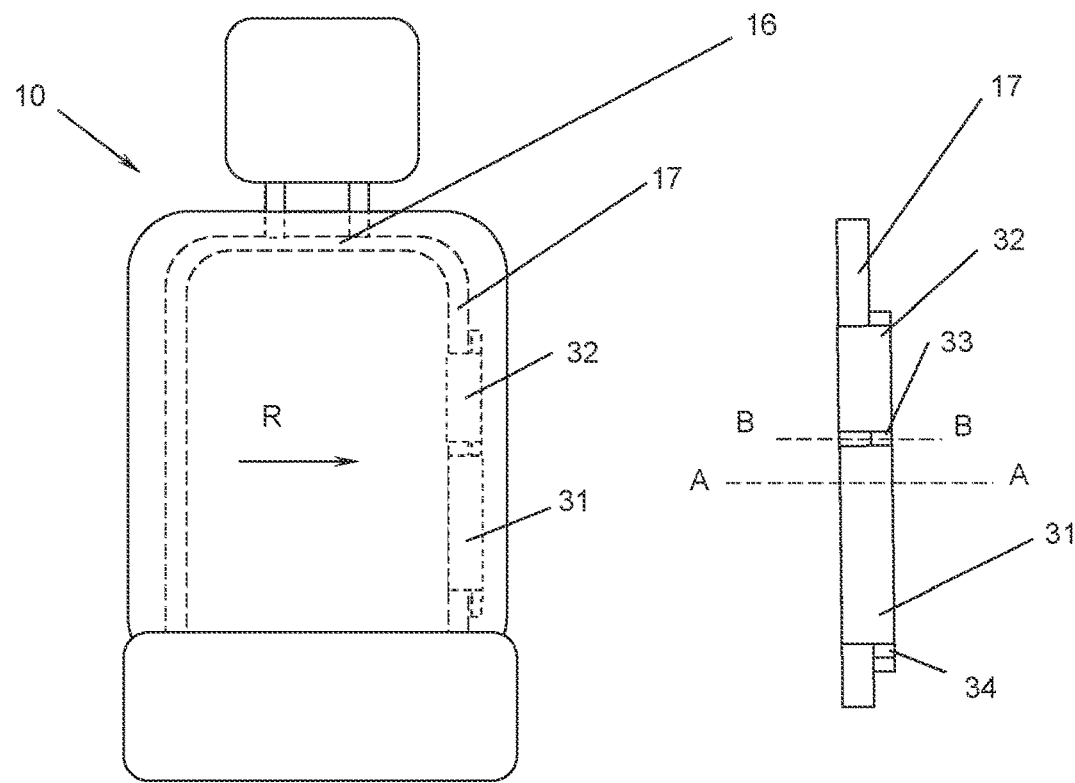
Fig. 12
Fig. 13
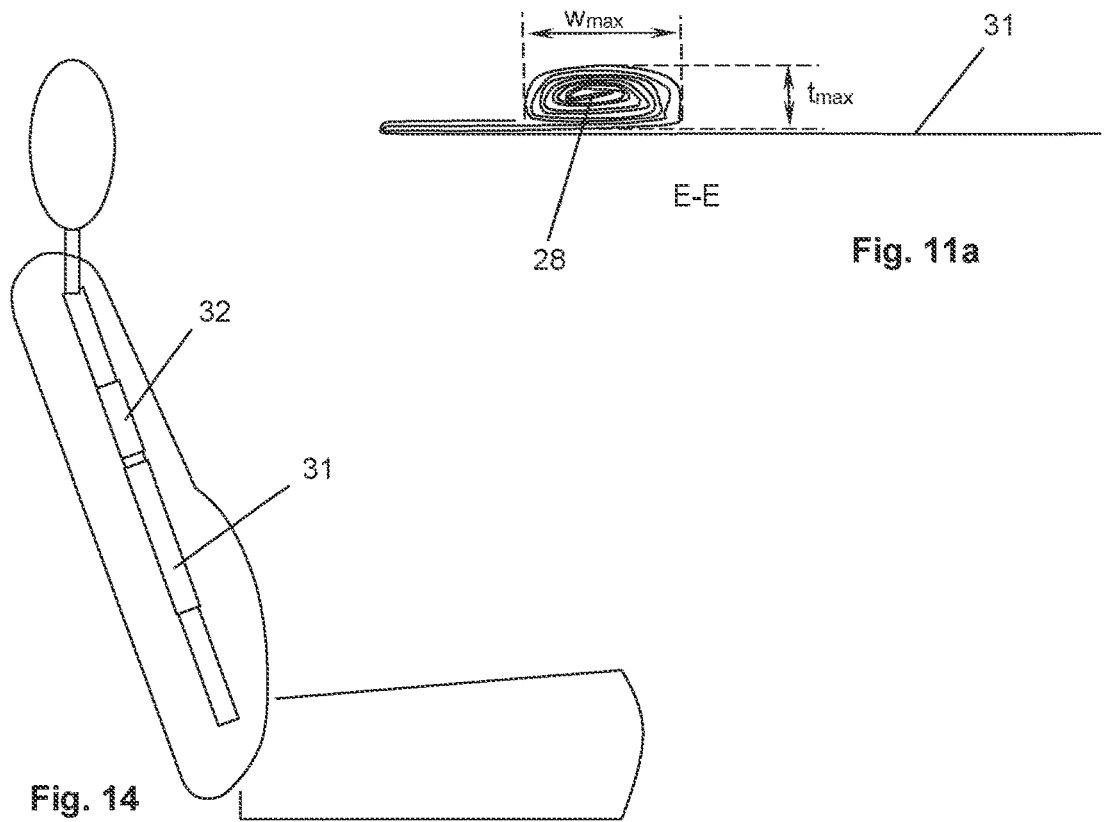
Fig. 11a
Fig. 14

VEHICLE SEAT ASSEMBLY WITH A VEHICLE SEAT AND A SIDE AIRBAG ASSEMBLY AND SIDE AIRBAG UNIT

The invention relates to a vehicle seat assembly comprising a vehicle seat and a side airbag assembly being attached to this vehicle seat according to the preamble of claim 1 and to side airbag unit according to claim 9.

The use of side airbag assemblies is widespread in today's automotive technology. Such a side airbag assembly comprises a side airbag and an inflator for inflating said side airbag. Usually the side airbag assembly is attached to a side portion of the frame of the back rest of the vehicle seat. In most cases the side airbag assembly is located on a side portion of the frame being located next to a vehicle structure such as the door. This position is referred to as the "outer side". The task of such a side airbag is protecting the occupant's pelvis and thorax from contacting a part of the side structure of the vehicle when this side structure intrudes to the interior of the vehicle due to a side collision. It is also known to provide a side airbag assembly on a side portion of the frame being located on the inside of the vehicle such that the airbag deploys between two seats, but since this is the more common case, reference is mainly made to "outside positioned" side airbag assemblies.

In the packed state, most of the side airbag is usually rolled or folded and rolled to an airbag package which is located on the outer side of the side portion of the frame such that this airbag package is placed between the frame and the outer structure of the vehicle. In case of a driver-side side airbag assembly of a left hand driven car, the side airbag assembly is located left of the left side portion of the frame.

A generic vehicle seat assembly is described in US 2015/0123382 A1. The side airbag assembly described in this document comprises a side airbag, an inflator and a wrapper extending completely around the airbag package. A first end of this wrapper is sewn to the rear end of the airbag, such that the airbag and the wrapper form an airbag unit. The second end of this wrapper is held by a stud extending from the inflator.

DE 10 2017 113 105 A1 also shows an airbag assembly with an airbag, an inflator and a wrapper extending completely around the airbag package. Here, both ends of the wrapper are held by inflator studs. An additional flap extends from that wrapper to the seat frame. This additional flap helps to keep the airbag package in place when the upholstery is applied to the seat frame.

A general problem with side airbag assemblies is that the available packing space is strictly limited. Additionally, the space available for the deployment between the side portion of the frame and the inner structure of the vehicle can be relatively small.

Starting from this prior art the invention sets itself the task to provide a vehicle seat assembly comprising a vehicle seat and a side airbag assembly in which available space is used in an optimized way.

This task is solved by a vehicle seat assembly with the features of claim 1. A side airbag unit for use in such a vehicle seat assembly is defined in claim 9.

According to the invention the shape of the airbag package as well as the way of holding said airbag package at the frame is optimized.

The airbag package is long and slim meaning that its length exceeds its maximum thickness at least by a factor of 10, preferably between 12 and 15. Additionally at least one wrapper having two functions, namely to keep this long and slim airbag package in this small thickness shape, and to attach this airbag package to the frame, is provided. To fulfill both tasks, this wrapper has a first section extending from the first end of the wrapper being attached of the side airbag at or near the rear end of the side airbag. This first section of the wrapper abuts the airbag package. The second end of the wrapper is attached to the frame in such a way that it abuts the frame but not the package. So, the final package shaping step and the attachment of the package to the frame is done in a joint step when attaching the second end of the wrapper to the frame. Therefore this wrapper is an attachment wrapper. Preferably, this attachment wrapper compresses the airbag package and keeps this compressed airbag package in its final mounting state on the frame.

In order to keep the airbag package in its rolled or folded and rolled state, it is preferred to provide at least two attachment wrappers, namely a lower attachment wrapper and an upper attachment wrapper, and an additional wrapper being located between the lower attachment wrapper and the upper attachment wrapper. This additional wrapper is exclusively connected to the airbag or the wrapper itself such that it can be used to keep the airbag package in its rolled or folded and rolled state without adding an additional layer. Preferably the attachment wrappers and the additional wrapper are parts of a joint, preferably single-pieced wrapper element. Often it will be preferred to provide at least one further additional wrapper, especially at the lower end of the airbag package.

As an alternative or in addition to the additional wrapper, the package could be held thin/slim by simply applying a seam, or a bonding or by pinching a plastic tag through the rolled/folded package.

Further preferred embodiments are defined in the further sub-claims.

Figure 11:
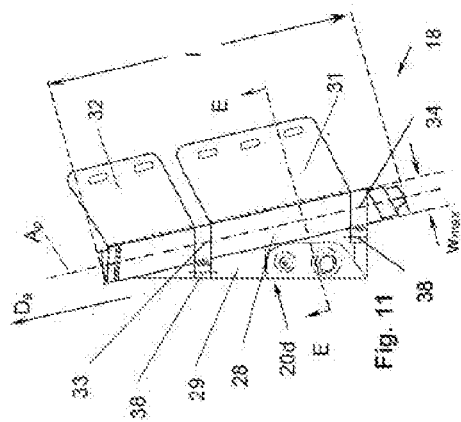
Figure 7:
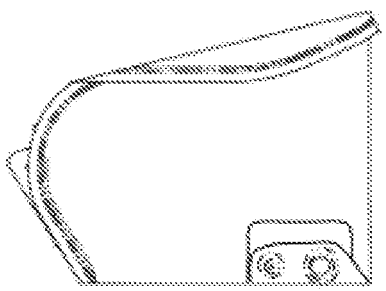
Figure 10:
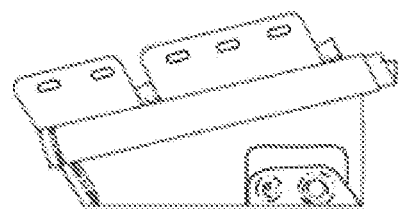
Figure 6:
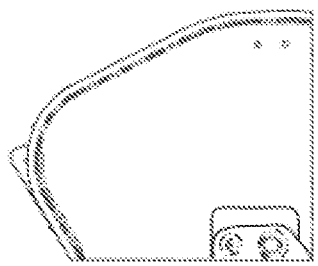
Figure 9:
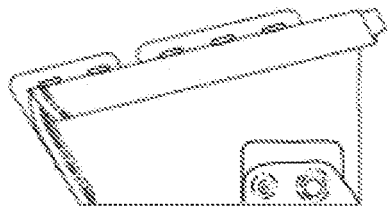
Figure 5:
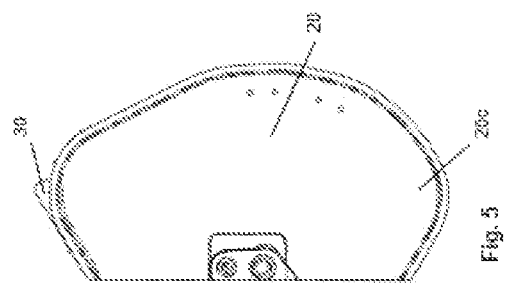
Figure 16:
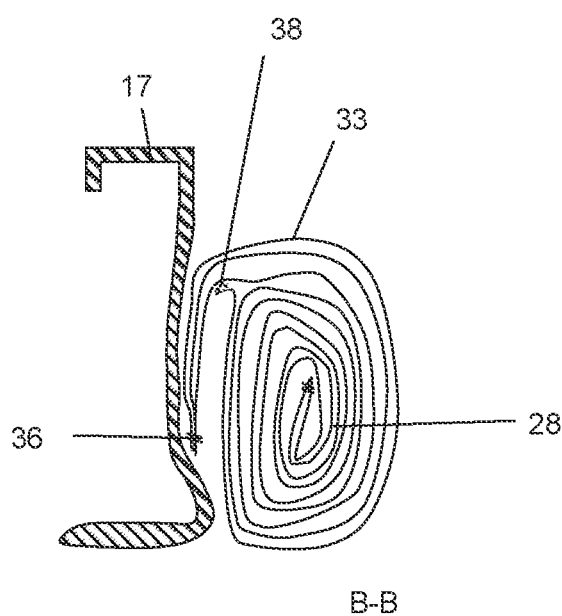
Figure 17:
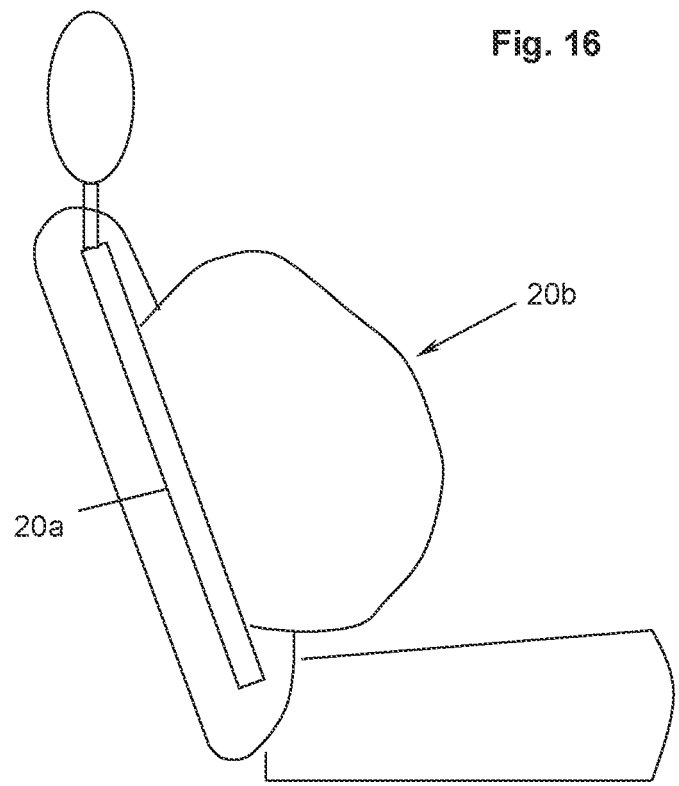

The invention will now be described in more detail by means of a preferred embodiment in view of the figures. The figures show:

FIG. 1 all cuttings of a side airbag unit,

FIG. 2 one of the cuttings, namely the wrapper element of FIG. 1 in an enlarged view, FIG. 3 some of the cuttings shown in FIG. 1 after the first sewing step, FIG. 4 what is shown in FIG. 3 after a further sewing step, FIG. 5 the complete side airbag unit, FIG. 6 the side airbag unit of FIG. 5 after a folding in step of the lower section of the side airbag of FIG. 5, FIGS. 7 to 10 the folding and rolling process of the side airbag, FIG. 11 what is shown in FIG. 10 after wrapping the additional wrappers around the airbag package and connecting their second ends to the side airbag, FIG. 11a a sectional view taken along plane E-E in FIG. 11, FIG. 12 a schematic plan view from the front onto a vehicle seat assembly on the driver side of a left hand driven car, FIG. 13 an enlarged view to the frame and the airbag assembly of claim 12, FIG. 14 a view to the vehicle seat assembly of FIG. 12 from direction R in FIG. 12, FIG. 15A sectional view taken along plane A-A in FIG. 13, FIG. 16A sectional view taken along plane B-B in FIG. 13, and FIG. 17 the vehicle seat assembly of FIG. 14 when the side airbag is deployed.

FIG. 1 shows all cuttings of the described embodiment of the inventive side airbag unit. The relevant cuttings are the cutting for the outer skin 21 and the wrapper element 30. Further, five cuttings 25a to 25e for re-enforcement layers and a diffusor element are shown. All cuttings (including the wrapper element 30) can be made of the same type of fabric, especially woven from yarns being made of a plastic material. Within the definitions chosen in this application, the cutting 21 for the outer skin and the cuttings for the re-enforcement layers/diffusor 25a-25e for the side airbag, and the wrapper element form the side airbag unit.

The cutting 21 for the outer skin has basically a "butterfly shape". It has a hole 22 for an inflator and a hole 23 for an inflator stud on its middle axis. Additionally, ventilation holes 24 are provided. Except for the ventilation holes 24 the cutting is mirror symmetrical.

In view of FIG. 2 the wrapper element 30 is described. This wrapper element 30 is single-pieced and extends from the first edge 30a to a second edge 30b. The regions near the first edge 30a are referred to as the first ends 31a, 32a, 33a, 34a, the regions near the second edge 30b are referred to as the second ends 31b, 32b, 33b, 34b. The cutting is basically wedge-shaped meaning that the edges 30a, 30b are not parallel to each other. The wrapper element 30 can be looked at as being comprised of four sections with each section extending from its first end 31a, 32a, 33a, 34a to its second end 31b, 32b, 33b, 34b. These four sections are the lower attachment wrapper 31, the upper attachment wrapper 32, the first additional wrapper 33 being positioned between the lower attachment wrapper 31 and the upper attachment wrapper 32, and the second additional wrapper 34 being located lower than the lower attachment wrapper 31. In the embodiment shown, the additional wrappers 33 and 34 are shorter than the lower attachment wrapper 31 and the upper attachment 32, so that the second edge 30b of the wrapper element 30 has steps. All wrappers 31 to 34 comprise a break line 39 which can for example be in form of a perforation. In the embodiment shown the lower attachment wrapper 31 and the upper attachment wrapper 32 each comprise attachment holes 35 at their second ends 31b, 32b. Further, a hole 37a for the inflator and a hole 37b for the inflator stud are provided at the first end 31a of the first attachment wrapper 31.

In a first process the wrapper element 30 and the cuttings for the reinforcement layers/deflector 25a to 25e are sewn to the cutting 21 for the outer skin of the side airbag (shown in FIG. 3). In order to understand the invention, only the connection between the wrapper element 30 and the cutting 21 for the outer skin of the side airbag is relevant. The connection between these two parts is created by the connection seams 36a to 36c. First connection seam 36a extends close to the rear edge 30a of the wrapper element 30—through the first end 32a of the second attachment wrapper 32, the first end 33a of the first additional wrapper 33 and a part of the first end 31a of the first attachment wrapper 31—and basically along the symmetry axis of the cutting 21 for the outer skin of the side airbag. The second and the third connection seams 36b and 36c extend around the holes for the inflator and the inflator stud and are thus located within the first end 31a of the first attachment wrapper. The hole 37a for the inflator is at least close to the first end 34a of the second additional wrapper 34. By means of these connection seams 36a to 36c the first ends 31a to 34a of the wrappers are connected to the outer skin of the side airbag and thus to the side airbag itself at the rear end of the side airbag.

As it is shown in FIG. 4 the cutting 25a for the remaining reinforcement layer is now sewn to the cutting 21 for the outer skin. Now the cutting 21 for the outer skin and thus the cuttings attached to it are folded along the symmetry axis of the cutting 21 for the outer skin and a peripheral seam 27 is applied to the cutting 21 for the outer skin such that the outer skin is closed and the side airbag 20 is complete. So, an airbag unit being comprised of the side airbag 20 and the wrapper element 30 is formed. This unit is shown in FIG. 5.

In the next step the lower area 20c of the side airbag is tucked inwards in order to reduce the length of the side airbag 20. Since it is desired to form a long and thin package, this tucked-in lower area is chosen as small as possible. Now (as shown in FIGS. 7 to 11) the side airbag 20 is rolled from its front end 20b towards its rear end 20a, but a triangle-shaped, not rolled section 29 of the side airbag remains. After this rolling process is completed such that an package 28 is formed, the second end 33b of the first additional wrapper 33 and the second end 34b of the second additional wrapper 34 are attached to the side airbag in the not rolled section via connections 38 which are preferably in form of bondings or sewings. In other embodiments (not shown) the second ends of the additional wrappers—or at least one of them—could be attached to the wrapper itself, for example by extending around the rear edge 20b of the side airbag 20. Further it would be possible to provide a tab connected to the side airbag 20 and/or to the wrapper element 30 to which the second end of the additional wrapper is connected.

In this state the additional wrappers 33 and 34 encircle the package 28 completely such that they keep this package 28 in shape. This package 28 extends in an axial direction $D_a$ from a lower end to an upper end such that is has a length l. Further it has a width $w_{max}$ perpendicular to the axial direction $D_a$. As one can see in FIG. 11, the package 28 defines an axis $A_p$ being parallel to the axial direction $D_a$. This axis $A_p$ is slanted relative to the rear edge 20d of the side airbag 20 and the triangle-shaped not rolled section 29 of the side airbag 20 remains between the airbag package 28 and the rear edge 20d. This geometry additionally helps to save packaging space, since because of the long and slim shape of the package 28 the inflator to be inserted into the side airbag is usually much shorter than the airbag package meaning that it does not extend to the upper end of this package. So, there is need for providing an "unrolled" portion of the side airbag near its upper end.

FIG. 11b is a sectional view taken along plane E-E in FIG. 11, perpendicular to the axis $A_p$. As one can see from this Figure, the rolled package is not round but flat, meaning that its maximum width $w_{max}$ exceeds its maximum thickness $t_{max}$. The maximum thickness $t_{max}$ is measured perpendicularly to the plane defined by the not yet wrapped around attachment wrappers 31, 32, the maximum width $w_{max}$ is measured parallel to this plane. The package 28 is slim meaning that the length l exceeds its maximum thickness $t_{max}$ at least by factor of 10. The production process of the side airbag unit 18 is now finished. The next step is to insert an inflator (not shown FIG. 11) such that the side airbag unit 18 and the inflator form a side airbag assembly ready for being attached to a side portion of the frame of the backrest of a vehicle seat. This is described now in view to FIGS. 12 to 17.

FIG. 12 is a schematic plan view from the front onto a driver seat 10 of a left-hand driven car with a side airbag assembly as just described being installed to the outer side portion 17 of the frame 16 of its backrest.

As indicated in FIG. 13 (being an enlarged schematic representation of the frame and the airbag assembly in FIG. 12) and FIG. 14 (being a view from direction R in FIG. 12), the airbag package 28 is basically located towards the front end of the side portion 17 of the frame and is basically located between the side portion of the frame and the outer structure of the vehicle. In the embodiment shown here, the front end of the side portion 17 of the frame has a recess in which the inflator 40 is at least partially accommodated (see FIGS. 15 and 16)

Figure 15:
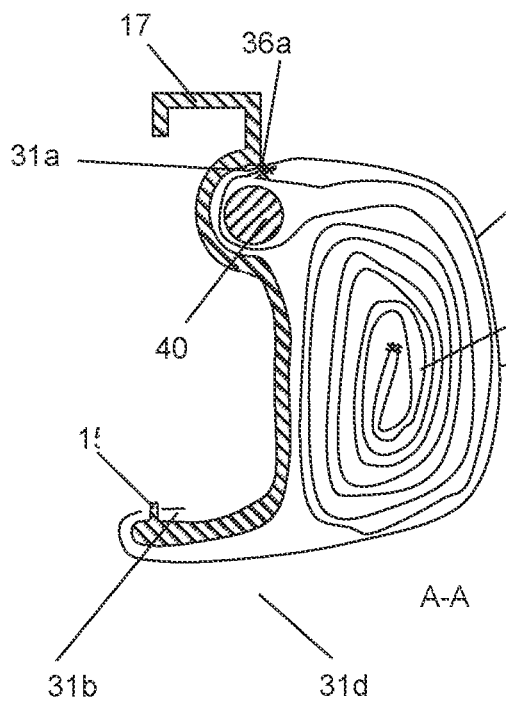

In the first assembly step the side airbag assembly is attached to the frame by means of an inflator stud extending through the hole 37b in the side airbag. Then the attachment wrappers 31 and 32 are pulled around a front area of the airbag package 28 and their second ends are attached to the side portion 17 of the frame. In the embodiment shown, the attachment holes 35 and protrusions 15 extending from the frame are used for this attachment. This is shown in FIG. 15 by means of the first attachment wrapper 31. 15. So, in the completely assembled state, the first attachment wrapper 31 can be looked at as being comprised of a first section 31c extending from the first end 31a being attached to the side airbag 20 at the rear end 20a of the side airbag 20, and a second section 31d extending from the second end 31b. The first section 31c abuts the airbag package 28 and the second section 31d abuts the frame (here the side portion 17 of the frame) but not the package 28. In case that the protrusion (or other holding element) is located directly at the front end of the side portion 17 of the frame, the second section could be very short, but still the second end 31b of the attachment wrapper 31 would not be in contact to the airbag package 28. The same applies to the second attachment wrapper 32. In this state the attachment wrappers 31 and 32 are under tension and so they serve for two purposes: They further compress the airbag package 28 and they keep this compressed airbag package 28 in its final mounting state on the frame. Since the attachment wrappers 31 and 32 extend almost along the complete length of the airbag package 28 this airbag package will not be disturbed when the upholstery of the vehicle is mounted to the frame.

The upper attachment wrapper 32 especially helps to prevent the upper area of the airbag package 28 from being bent downwards when the upholstery is mounted to the frame. This is essential because in case that the upper area is unintentionally bent, the airbag will not deploy properly.

In the embodiment shown, the second ends of the attachment wrappers are directly hooked to the frame, but of course other types of connections are possible and it would also be possible that the frame carries separate attachment elements. In this case the second ends of the attachment wrappers would be at least in contact to those separate attachment elements and not necessarily in direct contact to the frame, but still they would not be in contact to the side airbag.

The invention has been described by means of a side airbag assembly being mounted to an outer side portion of the seat frame, but of course the invention could also be applied to a side airbag assembly being mounted to an inner side portion of the seat frame such that the side airbag deploys between two seats.

LIST OF REFERENCE NUMBERS 10 vehicle seat/driver seat
12 seating
14 backrest
15 protrusion
16 fame of backrest
17 side portion of frame of backrest
17a rear end
17b front end
18 side airbag unit
20 side airbag
20a rear end
20b front end
20c lower area
20d rear edge
21 cutting for outer skin of side airbag
21a first layer
21b second layer
22 hole for inflator
23 hole for inflator stud
24 ventilation hole
25a-25e cuttings for reinforcement layers
27 peripheral seam
28 airbag package
29 not rolled section
30 wrapper element (cutting for wrapper)
30a rear edge
31 lower attachment wrapper
31a first end
31b second end
31c first section
31d second section
32 second attachment wrapper
32a first end
32b second end
33 first additional wrapper
33a first end
33b second end
34 second additional wrapper
34a first end
34b second end
35 attachment hole
36a, b, c connection seam
37a hole for inflator
37b hole for inflator stud
38 connection
39 break-line
40 inflator

The invention claimed is:

1. A vehicle seat assembly comprising:
a vehicle seat having a seat and a backrest, the backrest including a frame having first and second side portions; and
a side airbag assembly attached to one of the first and second side portions of the frame and including a side airbag at least partially rolled to an airbag package in an undeployed state, an inflator for inflating the side airbag and at least one wrapper extending at least partially around at least a section of the airbag package,
wherein the side airbag extends from a rear end to front end upon deployment,
wherein the airbag package has a length and a maximum thickness, wherein the at least one wrapper extends from a first end being attached to the side airbag at the rear end of the side airbag to a second end, and
wherein the at least one wrapper includes an upper attachment wrapper, a lower attachment wrapper, and at least a first additional wrapper located between the lower attachment wrapper and the upper attachment wrapper, both ends of the first additional wrapper directly attached to the side airbag, to the first additional wrapper itself, or to one of the upper and lower attachment wrappers, so that the first additional wrapper encircles the airbag package prior to mounting of the side airbag assembly to the frame.

2. The vehicle seat assembly of claim 1, further comprising a second additional wrapper with two ends both directly attached to the side airbag, wherein the second additional wrapper is located lower than the lower attachment wrapper.

3. The vehicle seat assembly of claim 2, wherein the upper and lower attachment wrappers and the first and second additional wrappers all comprise a break-line.

4. The vehicle seat assembly of claim 2, wherein the upper and lower attachment wrappers and the first additional wrapper are all parts of a wrapper element, the wrapper element is single-pieced.

5. The vehicle seat assembly of claim 4, wherein the wrapper element is triangle-shaped or wedge-shaped.

6. The vehicle seat assembly of claim 1, wherein the upper and lower attachment wrappers and the first additional wrapper all comprise a break-line.

7. The vehicle seat assembly of claim 1, wherein the upper and lower attachment wrappers and the first additional wrapper are all parts of a wrapper element, the wrapper element being a single-pieced wrapper element.

8. The vehicle seat assembly of claim 7, wherein the wrapper element is triangle-shaped or wedge-shaped.

9. The airbag unit of claim 1, wherein:
the upper and lower attachment wrappers and the first additional wrapper are ail parts of a wrapper element, the wrapper element being single-pieced, and
the airbag package defines an axis slanted relative to arear edge of the side airbag when the airbag unit being comprised of the side airbag and the wrapper element in a packed but pre-mounted state, such that the airbag has triangle-shaped section.

10. The vehicle seat assembly of claim 1, wherein the length of the airbag package exceeds the maximum thickness at least by a factor of 10.

11. The vehicle seat assembly of claim 1, wherein a second end of the first attachment wrapper is at least, indirectly attached to the frame and has a first section extending from the first end and abutting the airbag package, and the second end of the first attachment wrapper contacts the frame or an attachment element connected to the frame but is not connected to the side airbag.

12. An airbag unit for use in a vehicle seat assembly, the airbag unit comprising:
a side airbag at least partially rolled to an airbag package in an undeployed state;
an inflator for inflating the side airbag; and
at least one wrapper extending at least partially around at least a section of the airbag package,
wherein the side airbag is configured to extend from a rear end to front end upon deployment,
wherein the airbag package has a length and a maximum thickness,
wherein the at least one wrapper extends from a first end being attached to the side airbag at the rear end of the side airbag to a second end, and
wherein the at least one wrapper includes an upper attachment wrapper, a lower attachment wrapper, and at least a first additional wrapper located between the lower attachment wrapper and the upper attachment wrapper, both ends of the first additional wrapper directly attached to the side airbag, to the first additional wrapper itself, or to one of the upper and lower attachment wrappers, so that the first additional wrapper encircles the airbag package prior to mounting of the airbag unit to a frame of the vehicle seat assembly.

* * * * *